United States Patent
Behmer

(10) Patent No.: US 8,021,279 B2
(45) Date of Patent: Sep. 20, 2011

(54) BICYCLE TIRE BOOT AND METHOD OF USE THEREOF ON A TRAINER

(76) Inventor: James M Behmer, Evergreen, CO (US)

( * ) Notice: Subject to any disclaimer, the term of this patent is extended or adjusted under 35 U.S.C. 154(b) by 24 days.

(21) Appl. No.: 12/542,004

(22) Filed: Aug. 17, 2009

(65) Prior Publication Data

US 2011/0039663 A1 Feb. 17, 2011

(51) Int. Cl.
*A63B 69/16* (2006.01)

(52) U.S. Cl. .......................... 482/61; 152/170

(58) Field of Classification Search ............ 482/57, 482/61, 65; 152/158, 167, 169, 170, 171, 152/173, 175, 208, 556; 206/304.1; 224/42.2
See application file for complete search history.

(56) References Cited

U.S. PATENT DOCUMENTS

| | | | | |
|---|---|---|---|---|
| 929,203 A | * | 7/1909 | Fletcher | 152/177 |
| 1,209,442 A | * | 12/1916 | Jablonski | 152/189 |
| 1,441,262 A | * | 1/1923 | Bardo et al. | 152/187 |
| 1,752,024 A | * | 3/1930 | Parker | 152/177 |
| 1,884,330 A | * | 10/1932 | Stabili | 152/174 |
| 3,857,426 A | * | 12/1974 | Reed | 152/185 |
| 3,871,720 A | | 3/1975 | Mosshart | |
| 3,934,633 A | | 1/1976 | Bula | |
| 3,963,066 A | | 6/1976 | Schwartz | |
| 4,033,395 A | | 7/1977 | Berg | |
| 4,126,169 A | | 11/1978 | Magnuson | |
| 4,215,733 A | | 8/1980 | Rieger | |
| 4,231,407 A | | 11/1980 | James | |
| 4,733,705 A | * | 3/1988 | Dwiggins | 152/177 |
| 5,044,411 A | | 9/1991 | Doll | |
| 5,785,779 A | | 7/1998 | McGee | |
| 6,105,642 A | | 8/2000 | Carson | |
| 6,116,415 A | | 9/2000 | Rastelli | |
| 6,464,302 B1 | | 10/2002 | Huang | |
| 6,598,947 B2 | * | 7/2003 | Hannah | 305/170 |
| 6,857,992 B1 | * | 2/2005 | Kolda et al. | 482/61 |
| 7,013,548 B1 | | 3/2006 | Løtveit | |
| 7,478,723 B2 | | 1/2009 | Spater | |
| 7,530,933 B2 | * | 5/2009 | Chen | 482/63 |
| 2003/0024343 A1 | | 2/2003 | Perezlmize | |
| 2004/0129358 A1 | | 7/2004 | Ernst | |
| 2006/0060275 A1 | | 3/2006 | Crow | |
| 2007/0209743 A1 | * | 9/2007 | Mellet | 152/158 |
| 2009/0014107 A1 | | 1/2009 | Martin | |
| 2010/0062909 A1 | * | 3/2010 | Hamilton | 482/61 |

OTHER PUBLICATIONS

Web site showing bicycle tire protective cover used to protect a tire during transport of the wheel. Covers such as these have been available since at least the 1970s.

* cited by examiner

*Primary Examiner* — Loan Thanh
*Assistant Examiner* — Tam Nguyen
(74) *Attorney, Agent, or Firm* — Leyendecker & Lemire; Kurt Leyendecker

(57) ABSTRACT

Embodiments comprise a tire boot for installation over a bicycle wheel, typically a rear wheel, and the wheel's associated tire. The tire boot is intended for use in conjunction with an indoor training device wherein the boot includes a wear surface that is relatively resistant to wear when spun in contact with a roller of the training device.

14 Claims, 7 Drawing Sheets

BICYCLE TIRE BOOT AND METHOD OF USE THEREOF ON A TRAINER

FIELD OF THE INVENTION

The present invention relates generally to human powered vehicles, namely bicycles, accessories for such vehicles, and the use thereof.

BACKGROUND

Competitive bicycle racing requires cyclists spend a significant amount of time training and logging miles in order to be competitive. Ideally, riders train on the road or suitable pedestrian/bicycle paths. However, when the weather isn't suitable for riding, cyclists are often unable to train outdoors. While cyclists can use these days to cross train, such as swim or run on a treadmill, cross training does not replace nor is it as effective as time on a bike.

Accordingly, various training devices have been developed through the years that permit a cyclist to ride his or her bike while remaining stationary. One of the first of these devices is rollers. As the name implies, this device comprises a series of elongated cylinders that are situated perpendicularly bicycle wheel's direction of rotation and rotate as a user sits on, pedals and balances his or her bicycle. Essentially, the rolling cylinders replace the road and prevent the bicycle from being propelled forward when in use thereon.

One of the most significant issues with rollers is that they do not provide adequate resistance and as such riding a bicycle on rollers does not tend to tax the cardiovascular system of trained cyclists. To provide a cyclist with a cardiovascular workout, wind trainers were developed. Typical wind trainer comprises a small rotating cylinder to which one or more wind turbines are operatively coupled. When a bicycle is mounted to the trainer and ridden, rotation of the rear wheel turns the cylinder which in turn turns the wind turbines. Resistance created by the spinning turbines is transferred to the bicycle and the rider. The faster a rider pedals, the greater the resistance and the greater the cardiovascular strain experienced. Over time other means for creating resistance in place of wind turbines have become popular as well. For instance, stationary trainers utilizing magnetic and fluid resistance are well-known.

To mount a bicycle on a typical stationary trainer, the rear wheel of the bicycle and in particular the rear tire is placed in direct contact with a small rotating cylinder. Additionally, the rigid framework of the trainer is often coupled with the rear end of the bicycle frame or proximate to rear wheels axle. This helps prevent the bicycle form moving laterally during use. Depending on the style of trainer, the front wheel is either removed with the front fork being placed in dropouts or the front wheel remains on the bike and is used to stabilize the front end thereof. Most significantly, the front wheel and its associated tire remain essentially stationary while a bicycle is ridden on the trainer either on or off the bicycle and as such any wear on the front tire is minimal if there is any at all.

The rear tire, however, experiences wear as it is forced against and as it turns the cylinder to which the wind turbine or other resistance creating means is attached. The wear reduces the available lifespan of the tire and, as such, is undesirable. Accordingly, some riders may have a separate set of wheels (or separate rear wheel) with a spare or less expensive road tire mounted thereon. The rider exchanges the wheel having an expensive high dollar tire intended for outdoor use with the indoor training wheel whenever he/she desires to train indoors and switches back to the outdoor wheel before riding outdoors. While this exchange may be suitable to some riders, many riders do not have multiple sets of rear wheels each with its own cog set.

A rider with a single wheelset can opt to change the rear tire from the tire reserved for road use to one more suitable for trainer use. Unfortunately, switching out tires can take a significant amount of time and as such may only be suitable when the rider is not expecting to be using the bicycle outside for an extended period, such as in the dead of winter. However, in season a rider may need to switch between outdoor and indoor training depending on the nature of the weather on a daily basis making the operation of changing tires particularly onerous and impractical. Furthermore, changing tires may be even more problematic for those riders that employ a tubeless tire system that relies upon a semi-liquid gel to seal a tire to the rim. Simply, changing a tubeless tire and resealing the tire is exceedingly time consuming and is therefore done only when absolutely necessary.

DETAILED DESCRIPTION

Figure 1:
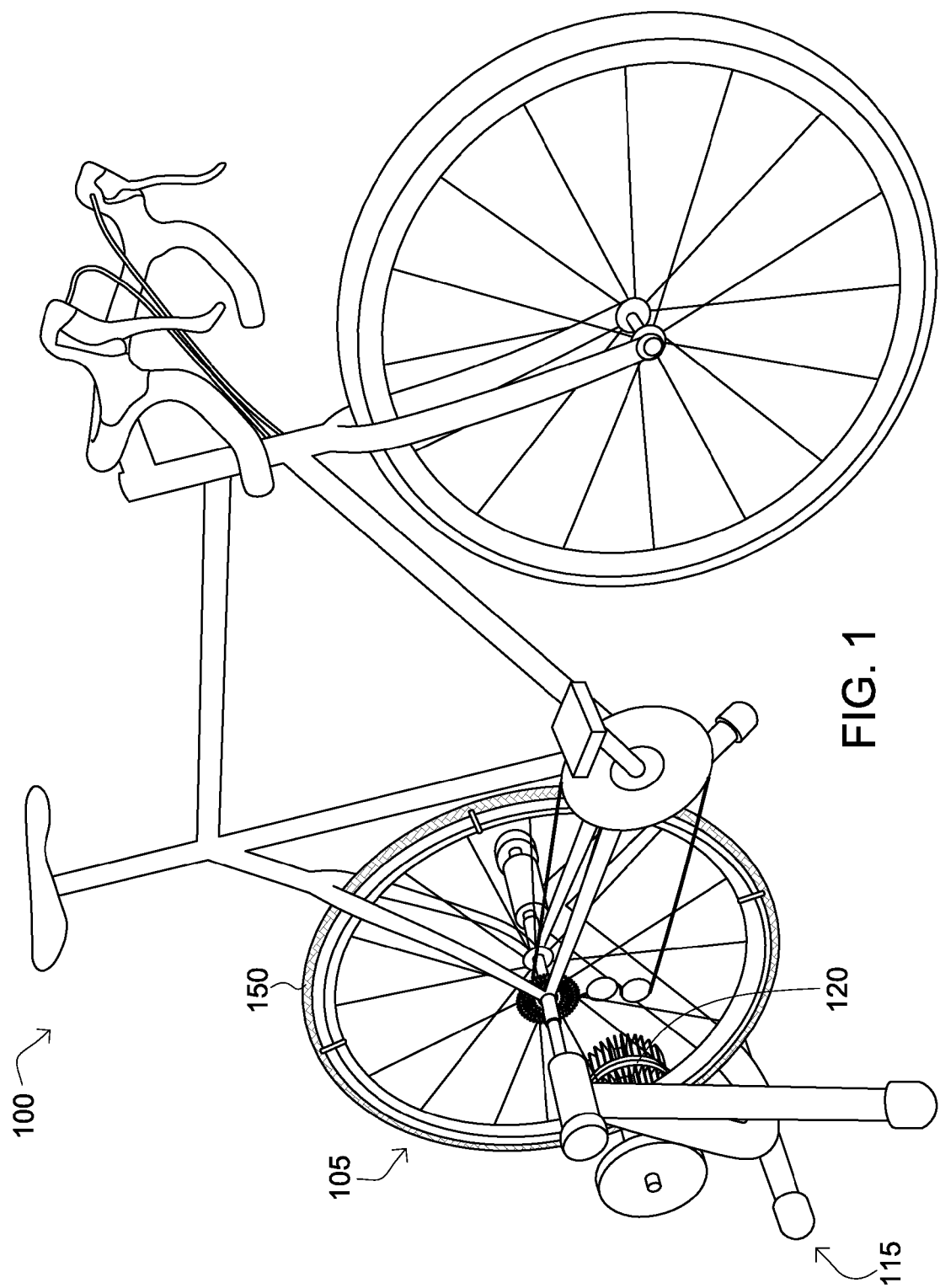
FIG. 1 comprises a typical bicycle mounted on a wind trainer wherein the rear wheel includes a tire boot covering and protecting the rear tire according to one embodiment of the present invention.

Embodiments of the invention comprise a tire boot (also referred to herein as a tire cover) for installation over a bicycle wheel, typically a rear wheel, and the wheel's associated tire. The tire boot is intended for use in conjunction with an indoor training device wherein the boot includes a wear surface that is relatively resistant to wear when spun in contact with a roller of the training device. As can be appreciated given the intended use, the wear surface also comprises a material and configuration that imparts a suitable degree of friction between with the roller so as to not cause undue slippage during use of the trainer and associated bike combination.

Simply, embodiments of the tire boot comprise an annular cover that is placed over the surface of the tread of a mounted tire on a bicycle wheel. The boot is most typically comprised of a rubber or elastomer that is stretched at least slightly when fit over the tire to maintain a tight fit around the entire circumference of the mounted tire. Furthermore, the relatively tight fit discourages sliding or rotation of the tire boot relative to the tire when in use. Effectively, the tire boot isolates the tread on the mounted tire from the surface of the trainer's roller thereby eliminating wear on the tire.

The tire boot is typically comprised of one or more rubber or elastomeric compounds the may be further reinforced with woven or unwoven fabrics or fibrous material. In some variations the boot has a similar construction as a tire but with reduced or truncated sidewalls and no mounting beads. Further, the interior surface of the boot can comprise a layer of a friction inducing compound to further increase the boot's hold on the underlying tire when mounted thereon. Some variations of the tire can further include straps or hooks that couple around the rim of the associated wheel or to the spokes of the wheel.

In use, a rider first removes his/her rear wheel from his/her bicycle prior to placing it in the wind trainer, slides the boot over the rear wheel and secures the boot in place as necessary. In some circumstances, the rider may need to reduce the inflation level of the rear tire prior to slipping the boot in place. The wheel is then reinstalled on the bike and the bike is installed in the trainer. The rider can then ride the trainer without worry that his/her expensive rear tire will become worn or otherwise damaged by use on the trainer. Prior to riding the bicycle outdoors, the rider need only reverse the process to remove the tire boot prior to riding outdoors. As can be appreciated, the entire process of installing or removing the tire boot adds only minutes to the process of mounting or removing a bicycle from an indoor trainer. Further, the amount of time required is a fraction of that which would be required to change out a rear wheel tire from an expensive outdoor tire to a suitable tire for trainer use.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase. The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" or "generally" as used herein unless otherwise indicated means a margin of +−10%. Also, as applicable, the term "substantially" as used herein unless otherwise indicated means a margin of +−5%. Concerning angular measurements, "about" or "generally" refers to +−10 degrees and "substantially" refers to +−5.0 degrees unless otherwise indicated. It is to be appreciated that not all uses of the above terms are quantifiable such that the referenced ranges can be applied.

The terms "bicycle" and "bike" are used interchangeably herein and refer to human powered vehicles of the type typically having two wheels.

The phrases and words "indoor trainer", "indoor bicycle trainer" or "trainer" as used herein refer to wind trainers as well as other types of trainers designed for use with a bicycle typically but not necessarily exclusively indoors. Broadly, the term is also intended to encompass rollers and any trainers that utilize hybrid means of providing resistance.

The phrases "tire boot" and "tire cover" are used interchangeably herein.

Embodiments of an Indoor Bicycle Trainer Specific Tire Boot for Use Over a Bicycle Wheel FIG. 1 is an illustration of a typical bicycle 100 mounted on an indoor trainer 115. Typically, the bicycle is secured to the trainer by way of the rear wheel's rear axle proximate the bicycle's rear dropouts. However, other methods and manners of coupling a bicycle to a trainer are known as is obvious to those of ordinary skill in the art. Typically in prior art configurations, the rear tire of the bicycle's rear wheel 105 is placed in direct contact with a roller of the trainer that is itself coupled with a resistance generator 120. Typical resistance generators include wind turbines, fluid turbines and magnetos although the nature of the resistance generator is not typically pertinent to the embodiments described herein. In yet other variations, the trainer can comprise a set of rollers. In embodiments of the present invention a tire boot 150 is mounted over the rear tire which itself is mounted on the rear wheel 105 of the bicycle 100. Accordingly, the running or tread surface of the rear tire is isolated from the trainer's roller and therefore wear.

On rollers, the front wheel of an associated bicycle typically spins during use and as such the front wheel is subject to wear albeit not as much as a driven rear wheel. Accordingly, a second tire boot can be mounted over the front wheel when rollers are utilized in place of a trainer of the type illustrated herein.

Figure 2:
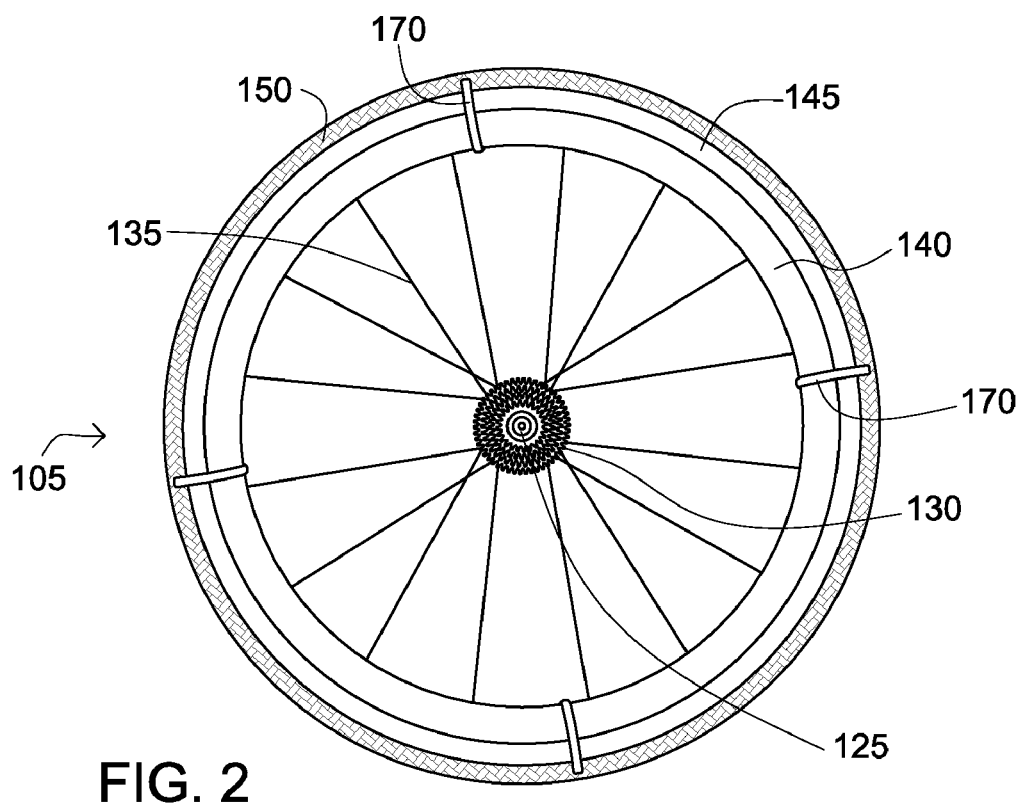
FIG. 2 comprises a rear bicycle wheel having a tire boot attached thereto according to one embodiment of the present invention.

FIGS. 2-4 and 8 illustrate an embodiment of the tire boot 150 both mounted to and separate from an associated bicycle wheel 105. FIG. 2 illustrates the boot mounted to a typical bicycle rear wheel. The rear wheel comprises a center hub 125 which also has an axle extending therethrough for rotatably mounting the wheel to a bicycle frame. A cog set 130 is typically mounted to the hub and when interfaced with a chain of the bicycle facilitates the transfer of power to the real wheel. A plurality of spokes 135 extend generally radially from the hub and are secured to the wheel rim 140 usually with spoke nipples (not shown). A tire 145 is mounted over the outwardly facing exterior circumferential surface of the rim. The large majority of bicycle wheels are of the clincher variety wherein two spaced circumferential beads are received in and against flanges on the rim to firmly hold the tire on the rim when a pneumatic tube is inflated therein. Other bicycle tires are of the tubular variety wherein a tire having a circular cross section is glued to the outwardly facing surface of the rim.

Universally, bicycle tires have an outwardly facing wear surface that is intended to come in direct contact with a travel surface. Simply, the friction between the surface of the travel, such as a road, and the wear surface, also referred to as the tread, imparts rotational movement of the tire to the road and propels the bicycle forward. If this outer surface is too hard and not sticky or tacky enough, the wheel may slip relative to the travel surface causing the bike to lose grip causing energy loss at best and instability at worst. However, if the wear surface is too soft, the longevity of the tire is compromised. Often high end racing tires have tackier wear surfaces to maximize grip and energy transfer at the expense of longevity. Tackier wear surfaces are subject to accelerated wear when used on indoor trainers.

As indicated above, the tire boot 150 is placed snuggly over the wear surface of the tire with the sides of the boot typically extending partially downwardly over the sidewalls of the rear wheel tire. Most typically the boot is held in tightly in place over the tire by friction as ideally, the diameter of the inside surface of the boot is nearly the same as the outside diameter of the underlying tire at the wear surface. In some variations, the boot stretches slightly when it is placed over the mounted tire 145 to facilitate a secure and tight fit. Other variations can include straps 170 to help attach and hold the boot in place.

Figure 4:
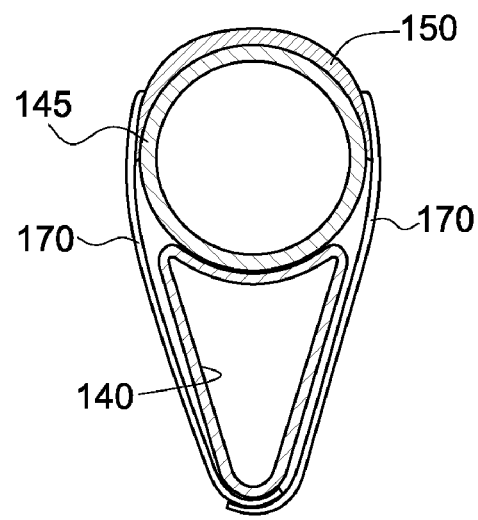
FIG. 4 comprises a cross sectional view of a rear bicycle wheel including a tire boot mounted thereon according to one embodiment of the present invention.

FIG. 4 shows a cross section of the rear tire assembly of FIG. 2. A tubular type tire 145 and rim 140 are shown but it is understood that a clincher type tire and rim can be specified as well without significant impact on the use and function of the tire boot. As is shown the boot effectively covers the entirety of the tread or wear surface of the tire to eliminate wear thereon during the use of an associated bicycle while riding it on an indoor trainer. A strap 170 extends downwardly from each side of the boot and around the inside circumferential surface of the rim. The respective opposing straps are adapted to secure to each other to help hold the tire boot in place. In at least one embodiment the straps comprise hook and loop material that can be overlapped to adhere the respective straps in place. The straps are secured to the sidewalls of the tire boot by any suitable means including but not limited to adhesive bonding, riveting, and sewing.

Figure 3:
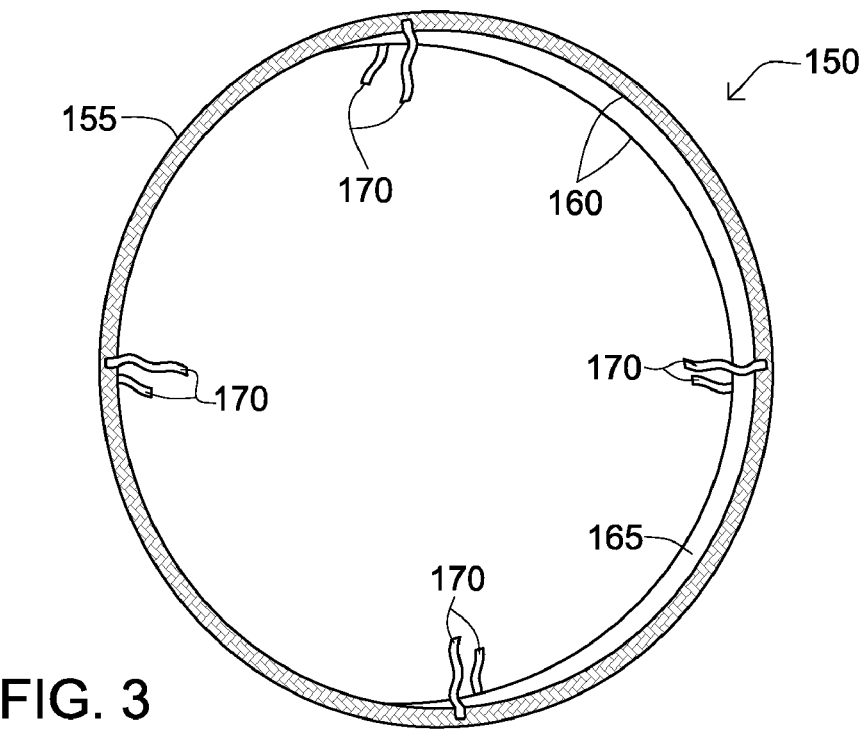
FIG. 3 comprises an isometric representation of a bicycle tire boot according to one embodiment of the present invention.

FIG. 3 comprises an illustration of a typical boot incorporating four hook and loop strap pairs 170 distributed around the boot to hold it in place when mounted over a bicycle tire. As can be appreciated the number and placement of the straps can vary. For instance in some embodiments the straps can be dispensed with altogether relying instead on the tight fit and static friction between the wear surface of the underlying tire and the interior surface 165 of the boot to hold the boot in place.

Figure 5A:
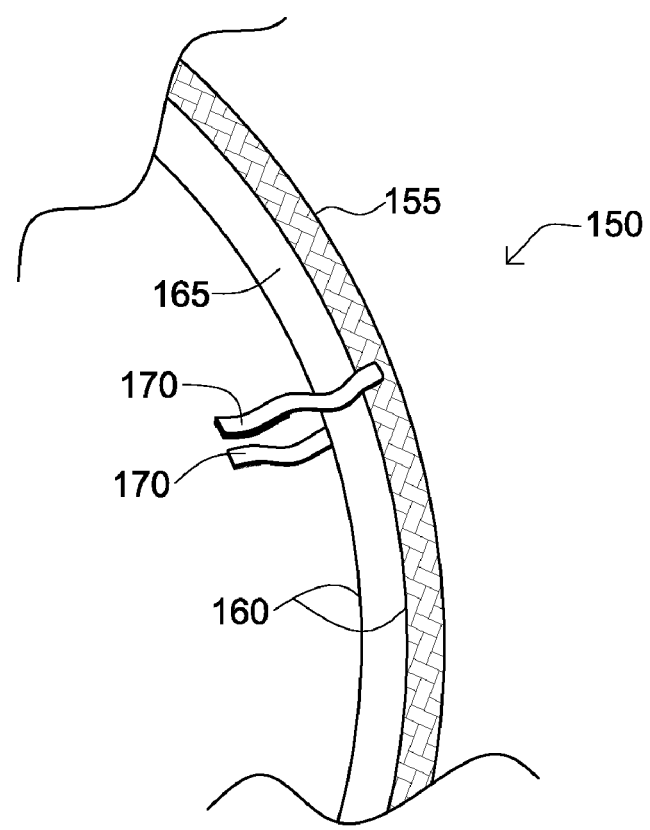
FIGS. 5a-c comprise close up partial isometric views of tire boots having differing configurations and different means for connecting over and to a tire.

FIG. 5a is a close up illustration of a tire boot 150 incorporating the hook and loop straps 170 as described above in relation to FIGS. 3 & 4. One strap having a hook type surface is secured to the sidewall of the boot proximate one of the boots circumferential edges 160 while a strap having a loop-type surface is secured to the opposing sidewall at a circumferentially similar location. In use, one strap is wrapped over the rim and the other strap is wrapped over the first to secure them to one another and assist in holding the tire boot 150 in place on an underlying mounted tire.

Figure 5B:
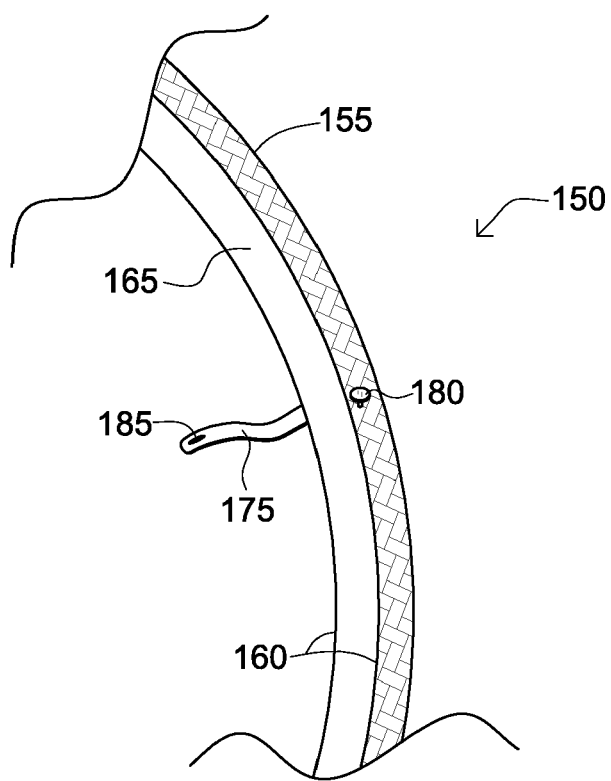
Figure 5C:
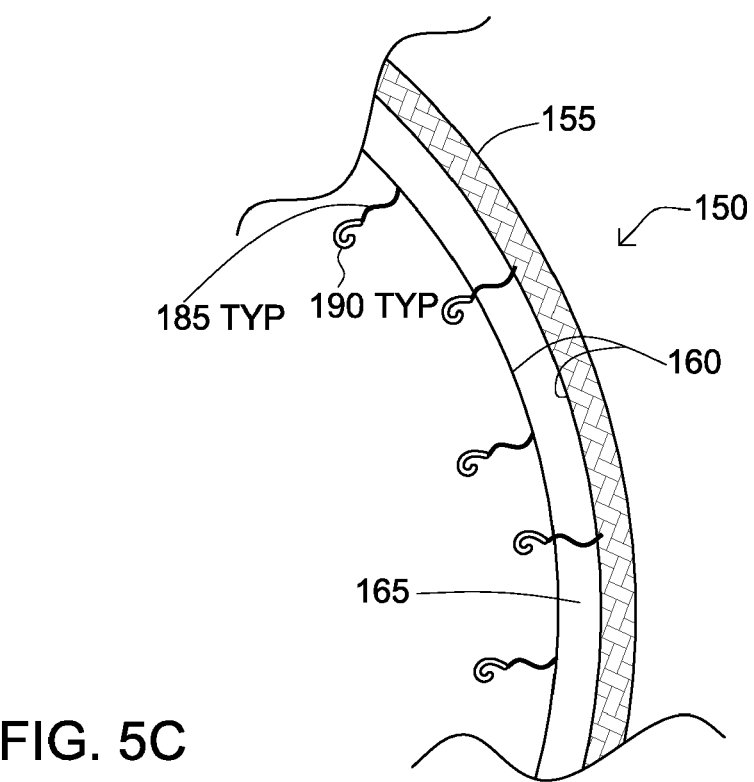

FIGS. 5b and 5c illustrate other strap or tether configurations that are also utilized to help hold the tire boot in place. In FIG. 5b, a strap 175 having a slot 185 at its distal end is provided on one sidewall while a button or short post 180 is secured to the other opposing sidewall in circumferentially similar location. In use, the slot is placed over the flared button portion of the post until resting on a smaller diameter portion there below to hold the strap around an associated rim of the bicycle wheel. In practice, a user will typically at least partially deflate the rear tire permitting him/her to install the boot over the wear surface. The user will then secure each of the straps to its opposing button/post. Finally, the user will reinflate the tire causing the straps to tighten against the rim to better secure the boot in place. The strap is typically constructed of a fabric or webbing having tensile properties that will limit its stretch during use. In other words, the strap will not typically include stretch material such as Spandex™ or Lycra™ as a strap that elastically deforms a significant amount when subject to typical and ordinary forces encounter during trainer use of the bicycle would act adequately to hold the boot in place. Straps whether of the variety described with reference to FIGS. 5a or 5c can also comprise other suitable materials such as but not limited to leather. The button or post of FIG. 5b can comprise a traditional button that is sewn or otherwise attached to the boot sidewall or it can comprise a metallic or plastic shaft that is riveted or otherwise mechanically secured to the sidewall.

Figure 6:
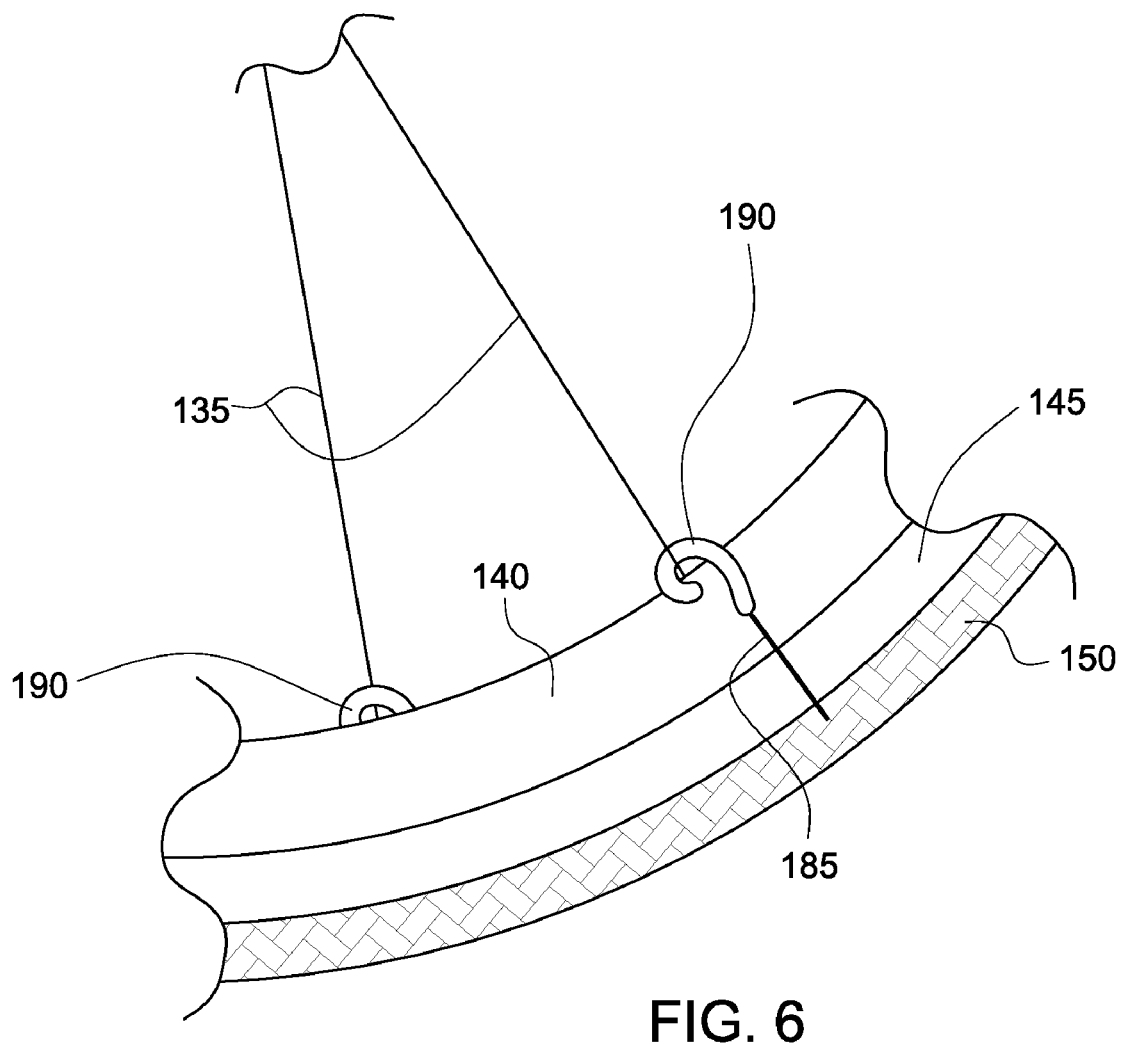
FIG. 6 comprises a close up partial view showing a tire boot mounted to and over a rear tire on a rear wheel according to one embodiment of the present invention.

FIG. 5c illustrates a series of tethers 185 having hook members 190 attached to their respective distal ends that can be hooked around the spokes 135 of an associated wheel to help hold the tire boot 150 in place. Unlike the embodiments incorporating straps, each of the tethers on one side of the boot are typically not aligned or directly opposing the tethers on the other side of the boot since the tethers have no direct connection or interaction with opposing tethers. Rather, the hook at the end of each tether is hooked around a spoke at the spoke's intersection with the rim as best shown in FIG. 6. One of the primary purposes of the tethers is to prevent the boot from sliding laterally during use and thereby keep the boot centered over the wear surface of the tire. In some variations, the tethers comprise elastic rope that is stretched by the user to fit associated hook over the spoke, but in other variations the rope can be primarily inelastic requiring the associated tire to be partially deflated to facilitate installation in a manner similar to that described above for the embodiments comprising pairs of straps. The hooks comprise any suitably materials but are typically comprised of plastic or metal. Each hook is typically attached to the distal end of an accompanying tether by a knot although other means of attachment are contemplated and known.

Figure 8:
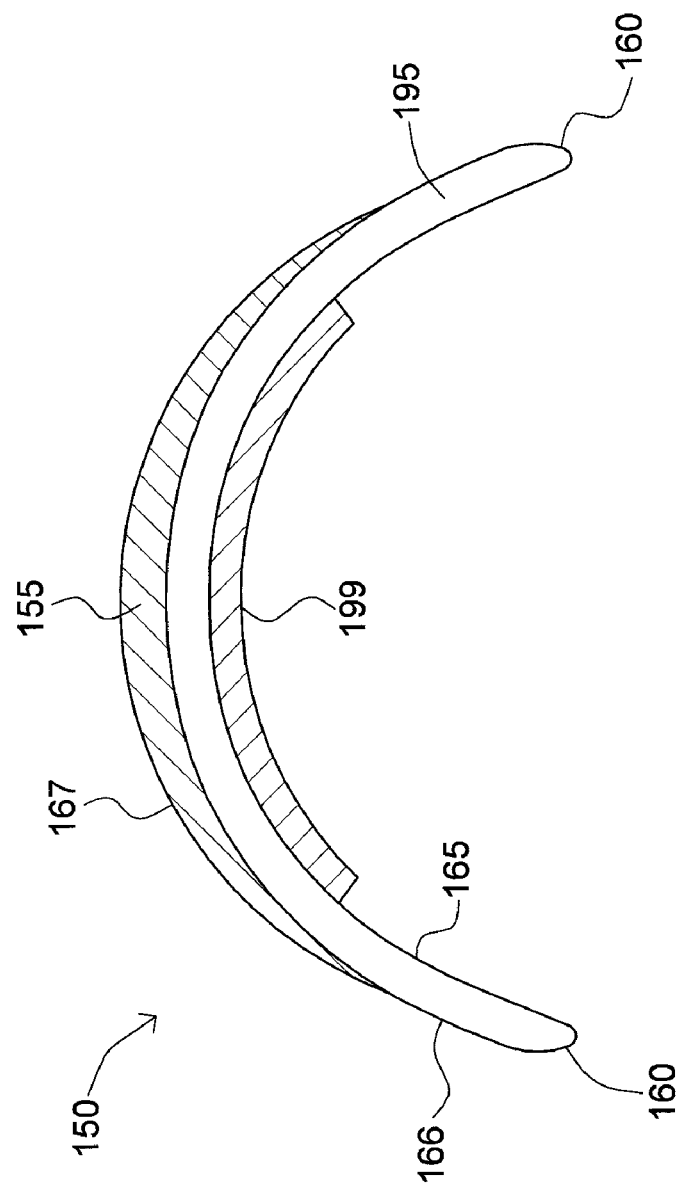

With reference to FIG. 8, the construction of an embodiment of a typical boot 150 is described. The core of the boot typically comprises a casing 195. The casing is the structural component of the boot much in the same way that the casing on the underlying bicycle tire provides for the structural integrity of the tire. Also, similar to a bicycle tire, the casing on a tire boot is typically comprised of a fabric or filament based core impregnated and encapsulated in an elastomer, such as synthetic rubber. The fabric, which is often comprised of nylon, cotton or other fibers provide strength that an unreinforced polymeric material cannot provide alone. A high strength casing is required in bicycle tires to in part withstand the load imposed by the bicycle tube which is inflated to relatively high pressures (60-150 psi). In contrast the tire boot does not withstand these loads and as such the boot casing need not be as robust as that of the underlying tire but certainly nothing prevents the use of stronger casings in certain embodiments. The boot casing must, however, be strong enough to provide structural integrity when subjected to riding forces on the trainer and in those variations having straps and tethers, the casing must provide additional structural integrity at the point of the straps' or tethers' attachment thereto. Suffice it to say that the casing provides the structural core of embodiments of the tire boot.

Typical clincher-type bicycle tire casings typically include a bead in the form of a hoop at each of the right and left circumferential edges. The beads are used to secure the tire to the rim when it is inflated. Since the boot is not secured to the rim, the boot often will not have left and right circumferential beads at its respective left and right circumferential edges 160. However, in some variations a bead is provided to help ensure the tire boot lays flush against the underlying tire and to provide an attachment/anchoring location for straps and/or tethers.

As the casing may not have the tackiness or gripping properties to ensure a smooth power and load transfer from the boot to the trainer's roller. Accordingly, a tread layer 155 is typically provided of which the outer surface thereof comprises the wear surface 167 of the boot. The tread layer is analogous to the tread layer on a bicycle tire except that the layer and wear surface can be optimized for use on a trainer. For instance, because there is little concern regarding cornering with the trainer specific tire boot, a harder more wear resistant material can be used in place of a very tacky layer as may be required on a high performance tire. Further, since rain and wet road conditions are of little concern with trainers, the wear surface can be smooth as it does not need to pump water away from its interface with the roller. Nevertheless, the tread layer must possess enough tackiness and grip so that it does not slip in contact with the roller especially when a relatively significant amount of energy is applied to the roller by a rider.

Embodiments of the boot 150 also includes an exterior surface 166, and an interior friction layer 199 located aptly enough on the inside surface 165 of the boot. The purpose of the friction layer is to interface directly with the tread of the underlying tire and prevent movement of the boot relative to the tire while in use. Accordingly, the friction layer is typically comprised of a polymeric material that is significantly tackier than that of the casing. Of note, since the friction layer is not subject to moving or dynamic forces there is usually little concern about this layer being subjected to wear and as such it can be tackier than would be permissible for the tread layer either on the boot or on the underlying tire. In some embodiments, the friction layer is unnecessary as the tackiness and gripping properties of the tread on the underlying tire is sufficient to prevent movement of the boot relative to the tire.

FIG. 8 illustrates but one configuration of a tire boot. It is to be appreciated that other embodiments and variations are also known and contemplated. For instance, one embodiment of the bicycle tire boot has essentially the same configuration as a clincher bicycle tire excepting the tire rim beads and a portion of the sidewall that is immediately adjacent the beads. In yet another embodiment, the boot comprises a single layer of polymeric material, reinforced or unreinforced, that balances between strength and sufficient tackiness. For instance, certain polyurethane formulations and perhaps other polymeric materials possess this balance of properties. A single layer/material boot can be akin to tire liners that are known in the industry for installation between a bicycle tire and its tube with variations and modifications, such as those described herein.

As described and illustrated herein, the boot 150 comprises a hoop. While this configuration is generally preferred, embodiments are contemplated wherein the boot comprises a linear strip that is wrapped circumferentially over the tire and secured where the respective ends meet. In yet other embodiments, the tire boot can comprise a relatively thin layer of polymeric material configured in hoop form that is stretched or otherwise secured over the underlying tire and is intended to protect the tire for only a single or limited number of uses. When a rider removes the bike from the trainer and desires to ride outside, he/she merely tears, rips or otherwise removes the cover from the tire and disposes of it.

Figure 7:
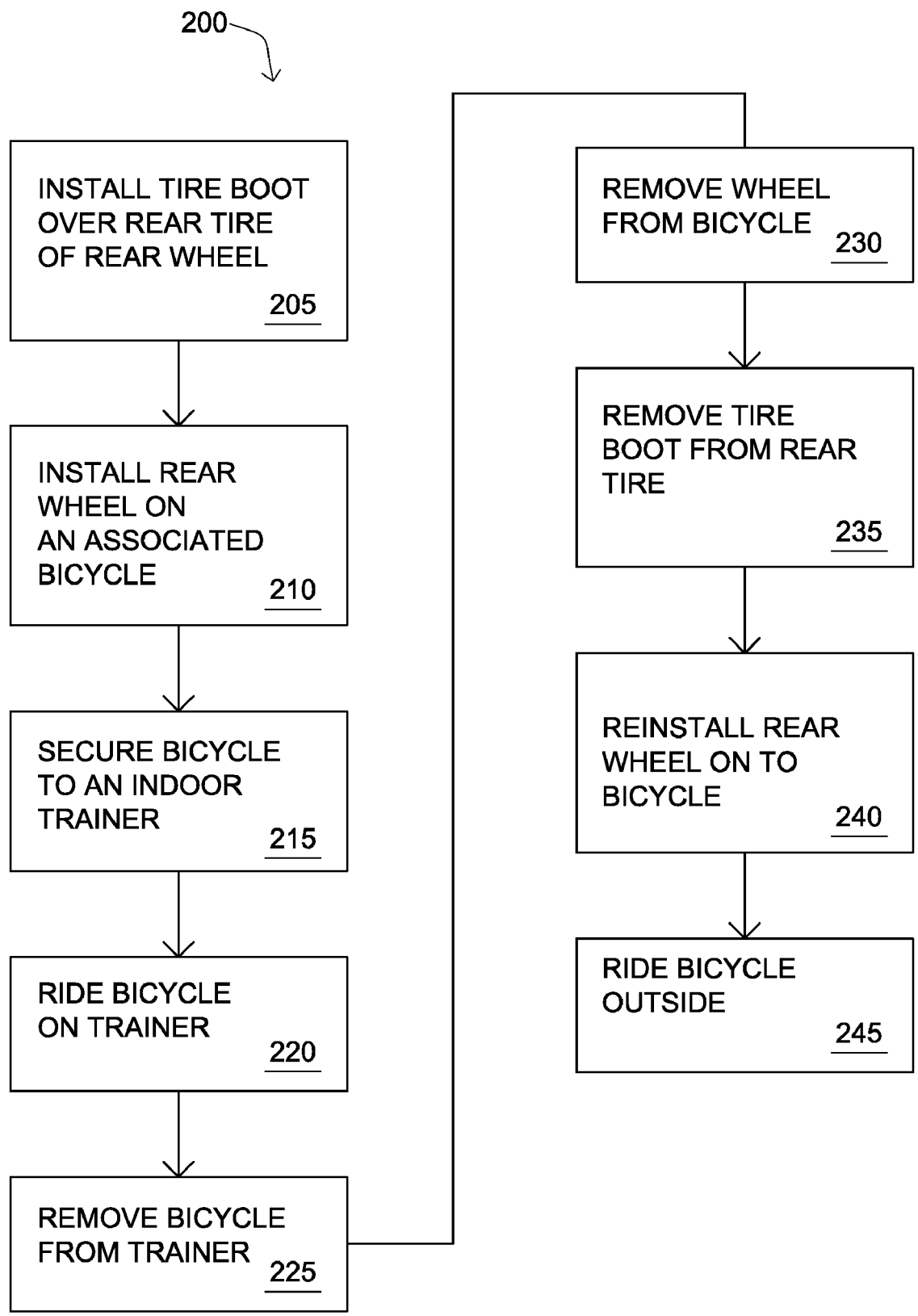
FIG. 7 comprises a flow chart pertaining to a methodology for using a bicycle in combination with a tire boot according to one embodiment of the present invention.

A Method of Using a Bicycle Trainer with a Bicycle Having a Rear Wheel with a Tire Boot Mounted Thereon FIG. 7 comprises a flow chart 200 pertaining to a methodology of using a bicycle in conjunction with a bicycle trainer wherein a tire boot is installed on at least the rear wheel of the bicycle.

FIG. 8 comprises cross sectional view of a tire boot according to an embodiment of the present invention.

Initially as indicated in block 205, the tire boot is installed over the rear tire of the bicycle's rear wheel. Typically, this operation first requires the user to remove the rear wheel from the bicycle. There can be several sub-operations to installing the boot. For instance, the rider will often reduce the air pressure significantly in the rear tire to temporarily reduce the effective diameter of the rear tire permitting him/her to more easily slide or stretch the boot over the tire. Once the tire boot is in place the tire, any straps or tethers are secured in place. Finally, as necessary the rear tire can be reinflated to a desired pressure.

After installation of the boot is complete, the rear wheel, as indicated in block 210, is reinstalled on the associated bicycle. The complete bicycle is then secured to the bicycle trainer as indicated in block 215. The means of securing the bicycle to the trainer can vary depending on the design of the trainer. With older design trainers the front wheel of the bicycle is removed and the front dropouts of the fork are clamped to the frame work of the trainer; whereas, newer trainers do not require the removal of the front wheel. Rather, the bicycle is secured to the trainer's framework at the rear dropouts of the frame using a quick release mechanism that extends through the rear wheel's axle.

Once mounted in the trainer the rider then rides the bicycle as he/she would normally do as is indicated in block 220. Of significance is that the rear tire is separated from the roller of the trainer by the tire boot thereby effectively eliminating wear on the wear or tread surface of the rear tire preserving it for outdoor use.

When the rider desires to ride outdoors, he/she removes the tire boot from the rear wheel of the bicycle as the boot described herein is typically not suitable for outdoor use. To do this he/she first removes the bicycle from the trainer, removes the rear wheel from the bicycle and reverses the installation process for the boot to remove it from the rear wheel as respectively indicated in blocks 225, 230 & 235.

The rider then re-installs the rear wheel sans the tire boot on his/her bike as indicated in block 240, and takes a ride outdoors as indicated in block 245.

Other Variations and Embodiments

The various preferred embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure.

I claim:

1. A method comprising:
    removing a rear wheel from a bicycle, the rear wheel including a tire mounted to a rim, the tire including a tread surface;
    installing a tire boot over the tire, the tire boot including an exterior surface, an interior surface and a wear surface on the exterior surface, the tire boot substantially covering the tread surface with at least a portion of the interior surface being in substantial direct contact with the tread surface and the wear surface facing radially outwardly;

installing the rear wheel with the tire boot installed on the bicycle;

securing the bicycle with the tire boot installed on the rear wheel to a bicycle trainer, the wear surface being in contact with a roller of the trainer and none of the tread surface being in contact with the roller; and riding the bicycle with the tire boot installed on the rear wheel on the trainer.

2. The method of claim 1 further comprising:

after riding the bicycle on the trainer, removing the rear wheel from the bicycle;

removing the tire boot from the rear tire of the rear wheel; and reinstalling the rear wheel without the tire boot on the bicycle.

3. A method comprising:

removing a rear wheel from a bicycle, the rear wheel including a tire mounted to a rim, the tire including a tread surface;

installing a tire boot over the tire, the tire boot including an exterior surface, an interior surface and a wear surface on the exterior surface, the tire boot substantially covering the tread surface with at least a portion of the interior surface being in substantial direct contact with the tread surface and the wear surface facing radially outwardly;

installing the rear wheel with the tire boot installed on the bicycle;

securing the bicycle with the tire boot installed on the rear wheel to a bicycle trainer, the wear surface being in contact with a roller of the trainer and none of the tread surface being in contact with the roller;

riding the bicycle with the tire boot installed on the rear wheel on the trainer; after riding the bicycle on the trainer, removing the rear wheel from the bicycle;

removing the tire boot from the rear tire of the rear wheel;

reinstalling the rear wheel without the tire boot on the bicycle; and riding the bicycle outdoors after said reinstalling the rear wheel without the tire boot thereon.

4. The method of claim 1, wherein the tire boot comprises, (i) a fiber reinforced casing and (ii) a tread layer on an exterior surface of the casing, the tread layer comprising polymeric materials and forming the wear surface.

5. The method of claim 4, wherein the tire boot further comprises, (iii) a friction layer on an interior surface of the casing made of a polymeric material.

6. The method of claim 1, wherein the tire boot includes a plurality of straps or tethers adapted for securing the tire boot to the rear wheel.

7. The method of claim 4, wherein the tire boot includes a plurality of straps or tethers adapted for securing the tire boot to the rear wheel.

8. The method of claim 6, wherein the plurality of straps or tethers comprises a plurality of straps including hook and loop material surfaces.

9. The method of claim 6, wherein the plurality of straps or tethers comprises a plurality of tethers, each tether having a distal end comprising a hook adapted to be secured around a spoke of the rear wheel.

10. The method of claim 3 wherein said installing a tire boot over the tire further includes (a) lowering air pressure within the tire, (b) stretching the tire boot over the tire, and (c) re-inflating the tire.

11. The method of claim 8, wherein installing a tire boot over the tire further includes securing the straps around the rim.

12. The method of claim 8, wherein said installing a tire boot over the tire further includes (a) lowering air pressure within the tire, (b) stretching the tire boot over the tire, (c) securing the straps around the rim and (d) re-inflating the tire.

13. The method of claim 1, wherein the bicycle trainer comprises rollers, further comprising:

removing a front wheel from a bicycle, the front wheel including a tire mounted to a rim, the tire including a tread surface;

installing a tire boot over the tire, the tire boot including a wear surface on an exterior surface and an interior surface, the tire boot substantially covering the tread surface with at least a portion of the interior surface being in substantial direct contact with the tread surface and the wear surface facing radially outwardly; and installing the front wheel with the tire boot installed on the bicycle.

14. The method of claim 1 wherein the tire boot comprises a modified bicycle tire with the left and right tire beads removed from respective left and right sidewalls.

* * * * *